US008310580B2

(12) United States Patent
Suzuki et al.

(10) Patent No.: US 8,310,580 B2
(45) Date of Patent: Nov. 13, 2012

(54) SOLID-STATE IMAGING DEVICE AND CAMERA SYSTEM FOR SUPPRESSING OCCURRENCE OF QUANTIZATION VERTICAL STREAKS

(75) Inventors: Fumitsugu Suzuki, Kanagawa (JP); Yusuke Oike, Kanagawa (JP)

(73) Assignee: Sony Corporation, Tokyo (JP)

( * ) Notice: Subject to any disclaimer, the term of this patent is extended or adjusted under 35 U.S.C. 154(b) by 244 days.

(21) Appl. No.: 12/821,443

(22) Filed: Jun. 23, 2010

(65) Prior Publication Data
US 2011/0019047 A1      Jan. 27, 2011

(30) Foreign Application Priority Data
Jul. 27, 2009   (JP) .................................. 2009-174367

(51) Int. Cl.
*H04N 5/335*   (2011.01)
(52) U.S. Cl. ...................................................... 348/308
(58) Field of Classification Search .................. 348/302, 348/307, 308, 241, 301; 250/208.1; 377/52, 377/111, 116; 341/118, 120, 126, 155, 164, 341/122
See application file for complete search history.

(56) References Cited

U.S. PATENT DOCUMENTS

| | | | | |
|---|---|---|---|---|
| 7,626,618 B2 * | 12/2009 | Adachi et al. | ................ | 348/248 |
| 8,023,001 B2 * | 9/2011 | Mizuta | ...................... | 348/222.1 |
| 8,063,960 B2 * | 11/2011 | Sakai et al. | ................... | 348/297 |
| 2003/0214597 A1 * | 11/2003 | Nam | .............................. | 348/308 |
| 2004/0008134 A1 * | 1/2004 | Krymski et al. | ............. | 341/155 |
| 2005/0195304 A1 * | 9/2005 | Nitta et al. | .................... | 348/308 |
| 2008/0211951 A1 * | 9/2008 | Wakabayashi et al. | ....... | 348/308 |
| 2009/0159782 A1 * | 6/2009 | Murakami et al. | ......... | 250/208.1 |

FOREIGN PATENT DOCUMENTS

JP      2005-278135      10/2005

OTHER PUBLICATIONS

Woodward Yang, et al. "An Integrated 800×600 CMOS Imaging System", ISSCC Digest of Technical Papers, IEEE International Solid-State Circuits Conference, Feb. 1999. pp. 304-305 and 471.

* cited by examiner

*Primary Examiner* — Tuan Ho
(74) *Attorney, Agent, or Firm* — Oblon, Spivak, McClelland, Maier & Neustadt, L.L.P.

(57) ABSTRACT

A solid-state imaging device includes: a pixel unit in which plural pixels that perform photoelectric conversion are arrayed in a matrix shape; and a pixel-signal readout unit that performs readout of pixel signals from the pixel unit in a unit of plural pixels, the pixel-signal readout unit including an AD conversion unit that performs analog-digital (AD) conversion, wherein the pixel-signal readout unit includes plural comparators that compare a reference signal as a ramp wave and readout analog signal potentials of the pixels in rows in which the comparators are provided, plural counter latches that are arranged to correspond to the plural comparators and capable of counting comparison times of the comparators corresponding thereto, stop the count when outputs of the comparators are inverted, and store values of the count, and an adjusting unit that performs offset adjustment for the reference signal every time the AD conversion is performed.

8 Claims, 9 Drawing Sheets

FIG.6
CONFIGURATION EXAMPLE OF CURRENT-CONTROLLED DAC

APPLICATION OF OFFSET VALUE

FIG.7A
WITHOUT OFFSET

ANALOG VALUE (X) (CONVERTED INTO DIGITAL VALUE)

D PHASE
| | A | B | C |
|---|---|---|---|
| a | 1.2 | 0.8 | 1.9 |
| b | 1.1 | 0.8 | 1.6 |
| c | 1.3 | 0.6 | 1.7 |

P PHASE
| | A | B | C |
|---|---|---|---|
| a | 0.9 | 0.4 | 1.6 |
| b | 0.7 | 0.5 | 1.5 |
| c | 0.9 | 0.3 | 1.4 |

DIGITAL VALUE (Y) (AFTER A/D CONVERSION)

D PHASE
| | A | B | C |
|---|---|---|---|
| a | 1 | 0 | 1 |
| b | 1 | 0 | 1 |
| c | 1 | 0 | 1 |

P PHASE
| | A | B | C |
|---|---|---|---|
| a | 0 | 0 | 1 |
| b | 0 | 0 | 1 |
| c | 0 | 0 | 1 |

AFTER CDS (Z) (D PHASE − P PHASE)
| | A | B | C |
|---|---|---|---|
| a | 1 | 0 | 0 |
| b | 1 | 0 | 0 |
| c | 1 | 0 | 0 |

FIG.7B
WITH OFFSET

OFFSET VALUE

D PHASE (offsets: +0.1, +0.0, +0.0)
| | A | B | C |
|---|---|---|---|
| a | 1.3 | 0.9 | 2.0 |
| b | 1.1 | 0.8 | 1.6 |
| c | 1.3 | 0.6 | 1.7 |

P PHASE (offsets: +0.3, +0.2, +0.1)
| | A | B | C |
|---|---|---|---|
| a | 1.2 | 0.7 | 1.9 |
| b | 0.9 | 0.7 | 1.7 |
| c | 1.0 | 0.4 | 1.5 |

D PHASE
| | A | B | C |
|---|---|---|---|
| a | 1 | 0 | 2 |
| b | 1 | 0 | 1 |
| c | 1 | 0 | 1 |

P PHASE
| | A | B | C |
|---|---|---|---|
| a | 1 | 0 | 1 |
| b | 0 | 0 | 1 |
| c | 1 | 0 | 1 |

AFTER CDS
| | A | B | C |
|---|---|---|---|
| a | 0 | 0 | 1 |
| b | 1 | 0 | 0 |
| c | 0 | 0 | 0 |

SOLID-STATE IMAGING DEVICE AND CAMERA SYSTEM FOR SUPPRESSING OCCURRENCE OF QUANTIZATION VERTICAL STREAKS

BACKGROUND OF THE INVENTION

1. Field of the Invention

The present invention relates to a solid-state imaging device represented by a CMOS image sensor and a camera system.

2. Description of the Related Art

For manufacturing of the CMOS image sensor, a manufacturing process same as that for a general CMOS integrated circuit can be used. The CMOS image sensor can be driven by a single power supply. In the CMOS image sensor, an analog circuit and a logic circuit manufactured by using a CMOS process can be mixed in the same chip.

Therefore, the CMOS image sensor has plural significant advantages such as an advantage that the number of peripheral ICs can be reduced.

As an output of an output circuit of a CCD, a one-channel (ch) output by an FD amplifier having a floating diffusion layer (FD) is mainly used.

On the other hand, the CMOS image sensor has an FD amplifier for each of pixels. As an output of the CMOS image sensor, a column-parallel output for selecting certain one row in a pixel array and simultaneously reading out pixels in the row in column direction is mainly used.

This is because it is difficult to obtain a sufficient driving ability with the FD amplifier arranged in the pixel and, therefore, it is necessary to reduce a data rate and parallel processing is advantageous.

Various circuits are proposed as an image signal readout (output) circuit of the column-parallel output CMOS image sensor.

One of the most advanced forms of the circuits is a circuit of a type that includes an analog-digital converter (hereinafter abbreviated as ADC) for each of columns and extracts a pixel signal as a digital signal.

CMOS image sensors mounted with such column-parallel ADCs are disclosed in, for example, W. Yang et al., "An Integrated 800×600 CMOS Image System," ISSCC Digest of Technical Papers, pp. 304-305, February, 1999 and JP-A-2005-278135.

Figure 1:
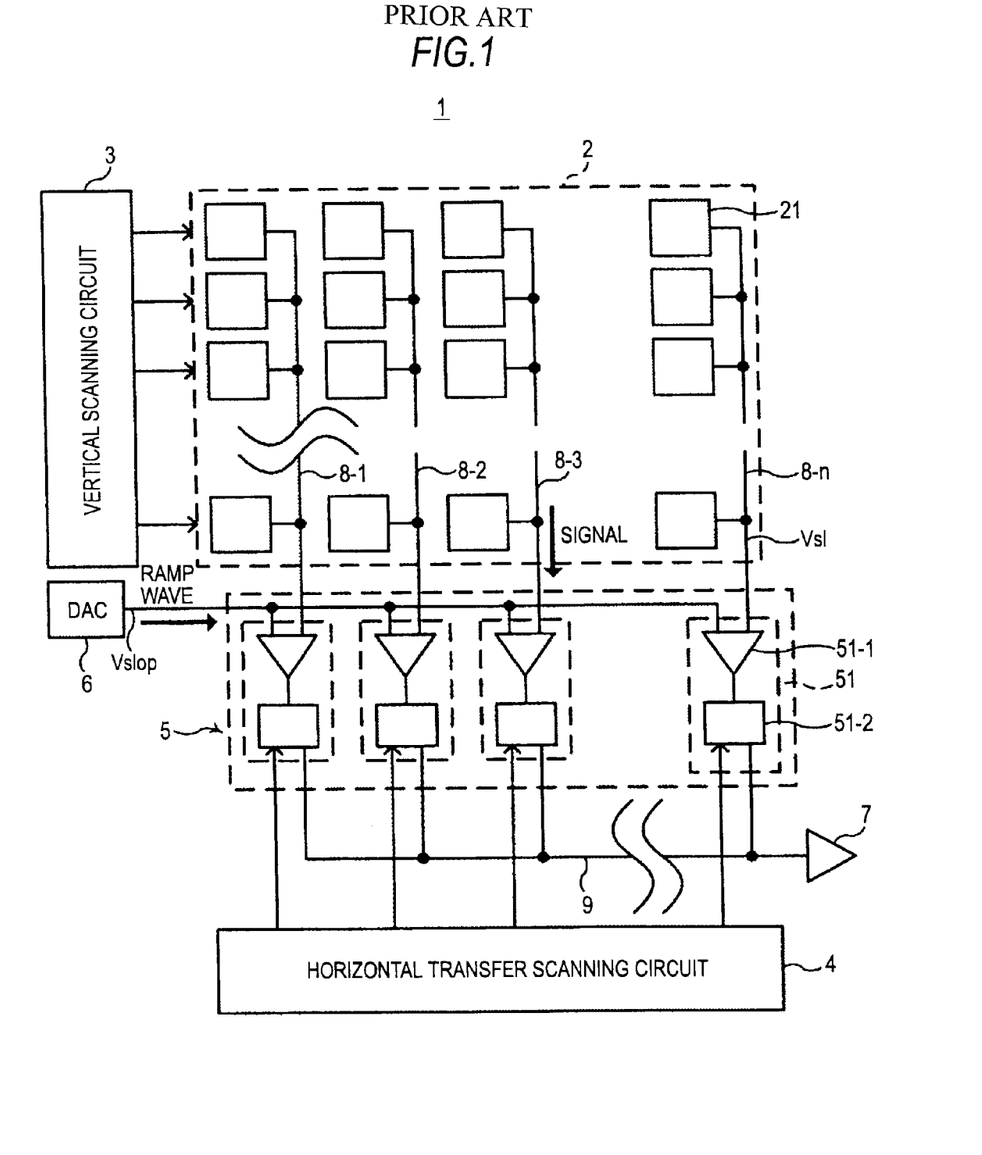
FIG. 1 is a block diagram of a configuration example of a solid-state imaging device (a CMOS image sensor) mounted with column-parallel ADCs.

FIG. 1 is a block diagram of a configuration example of a solid-state imaging device (a CMOS image sensor) mounted with column-parallel ADCs.

A solid-state imaging device 1 includes, as shown in FIG. 1, a pixel unit 2, a vertical scanning circuit 3, a horizontal transfer scanning circuit 4, and a column processing circuit group 5 including an ADC group.

The solid-state imaging device 1 further includes a digital-analog converter (hereinafter abbreviated as DAC) 6 and an amplifier circuit (S/A) 7.

In the pixel unit 2, unit pixels 21 including photodiodes (photoelectric conversion elements) and intra-pixel amplifiers are arranged in a matrix shape.

In the column processing circuit group 5, column processing circuits 51 are arrayed in plural columns to form ADCs in the respective columns.

The column processing circuits (ADCs) 51 include comparators 51-1 that compare a reference signal RAMP (Vslop) as a ramp waveform (RAMP) obtained by stepwise changing a reference signal generated by the DAC 6 and analog signals obtained, for respective row lines, from the pixels through vertical signal lines.

The column processing circuits 51 further include counter latches (memories) 51-2 that count comparison times of the comparators 51-1 and store results of the count.

The column processing circuits 51 have an n-bit digital signal converting function and are arranged in respective vertical signal lines (column lines) 8-1 to 8-n. Consequently, column-parallel ADC blocks are formed.

Outputs of the memories 51-2 are connected to a horizontal transfer line 9 having, for example, k-bit width. k amplifiers circuits 7 corresponding to the horizontal transfer line 9 are arranged.

Figure 2:
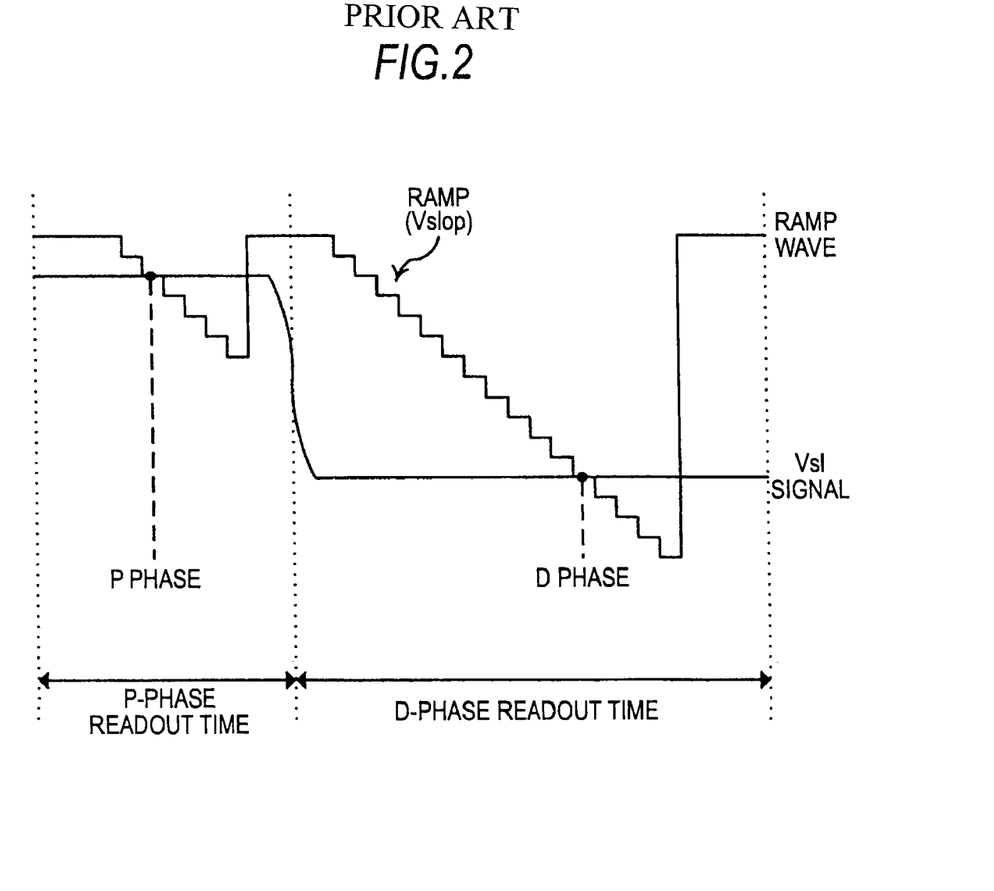
FIG. 2 is a timing chart of circuits shown in FIG. 1.

FIG. 2 is a timing chart of the circuits shown in FIG. 1.

In the column processing circuits (ADCs) 51, analog signals (potential Vsl) read out to the vertical signal lines 8 are compared with the reference signal RAMP (Vslop), which changes stepwise, by the comparators 5-1 arranged in the respective columns.

The count is performed by the counter latches 51-2 until levels of the analog potentials Vsl and the reference signal RAMP (Vslop) cross and outputs of the comparators 51-1 are inverted. The potentials (the analog signals) Vsl of the vertical signal lines 8 are converted into digital signals (AD-converted).

The AD conversion is performed twice in one readout.

In the first AD conversion, a reset level (P phase) of the unit pixels 21 is read out to the vertical signal lines (8-1 to 8-n) and the AD conversion is executed.

The reset level P phase includes fluctuation in each of the pixels.

In the second AD conversion, signals photoelectrically converted by the unit pixels 21 are read out to the vertical signal lines 8 (8-1 to 8-n) (D phase) and the AD conversion is executed.

The D phase also includes fluctuation in each of the pixels. Therefore, correlated double sampling (CDS) can be realized by executing (a D phase level-a P phase level).

The signals converted into digital signals are recorded in the counter latches 51-2, readout to the amplifier circuits 7 via the horizontal transfer line 9 in order by the horizontal (column) transfer scanning circuit 4, and finally output.

In this way, column-parallel output processing is performed.

Count processing of the counter latches 51-2 during the P phase is referred to as primary sampling. Count processing of the counter latches 51-2 during the D phase is referred to as secondary sampling.

SUMMARY OF THE INVENTION

Even if characteristics of the photodiodes (PDs) and the influence of a dark current are neglected, the CDS is also performed to remove fluctuation in thresholds of readout amplifier transistors appearing in the signal potentials Vsl read out to the vertical signal lines 8.

In the CDS, a difference between a reset level and a signal level (the reset level+a net signal level) is calculated. Therefore, ideally, when the net signal is 0, the difference is 0.

In some case, the difference is not 0 even when there is no incident light.

This is because, although plural causes are conceivable, an offset value is superimposed on a primary sampling value or a secondary sampling value because of the influence of a reset characteristic of a ramp wave and a reset characteristic of comparators besides noise.

Even if there is superimposition of the offset value between the samplings, there is no influence on image quality when there is no difference in a way of rounding of the A/D conversion.

However, when the way of rounding is different, i.e., when a quantization error occurs, it is difficult to cancel the fluctuation with the CDS.

Since one comparator is provided in each of the columns, correlation in the column is high. A quantization error that occurs under a fixed condition easily occurs in some columns and hardly occurs in other columns.

When resolution is high, a range of values that a discrete value takes is wide. However, according to a fall in the resolution, the quantization error appears as fixed vertical streaks in an image.

Therefore, it is desirable to provide a solid-state imaging device and a camera system that can suppress occurrence of quantization vertical streaks caused by a rounding error during the AD conversion and realize improvement of image quality.

According to an embodiment of the present invention, there is provided a solid-state imaging device including: a pixel unit in which plural pixels that perform photoelectric conversion are arrayed in a matrix shape; and a pixel-signal readout unit that performs readout of pixel signals from the pixel unit in a unit of plural pixels, the pixel-signal readout unit including an AD conversion unit that performs analog-digital (AD) conversion. The pixel-signal readout unit includes plural comparators that compare a reference signal as a ramp wave and readout analog signal potentials of the pixels in rows in which the comparators are provided, plural counter latches that are arranged to correspond to the plural comparators and capable of counting comparison times of the comparators corresponding thereto, stop the count when outputs of the comparators are inverted, and store values of the count, and an adjusting unit that performs offset adjustment for the reference signal every time the AD conversion is performed.

According to another embodiment of the present invention, there is provided a camera system including: a solid-state imaging device; and an optical system that focuses a subject image on the solid-state imaging device. The solid-state imaging device includes a pixel unit in which plural pixels that perform photoelectric conversion are arrayed in a matrix shape, and a pixel-signal readout circuit that performs readout of pixel signals from the pixel unit in a unit of plural pixels, the pixel-signal readout circuit including an AD conversion unit that performs analog-digital (AD) conversion. The pixel-signal readout circuit includes plural comparators that compare a reference signal as a ramp wave and readout analog signal potentials of the pixels in rows in which the comparators are provided, plural counter latches that are arranged to correspond to the plural comparators and capable of counting comparison times of the comparators corresponding thereto, stop the count when outputs of the comparators are inverted, and store values of the count, and an adjusting unit that performs offset adjustment for the reference signal every time the AD conversion is performed.

According to the embodiments of the present invention, it is possible to suppress occurrence of quantization vertical streaks caused by a rounding error during the AD conversion and realize improvement of image quality.

DESCRIPTION OF THE PREFERRED EMBODIMENTS

An embodiment of the present invention is explained below with reference to the drawings. The embodiment is explained in the following order:

1. Overall configuration example of solid-state imaging device
2. Configuration example of column ADC
3. Formation example of reference signal by DAC
4. Configuration example of camera system FIG. 3 is a block diagram of a configuration example of a solid-state imaging device (a CMOS image sensor) mounted with column-parallel ADCs according to an embodiment of the present invention.

Figure 3:
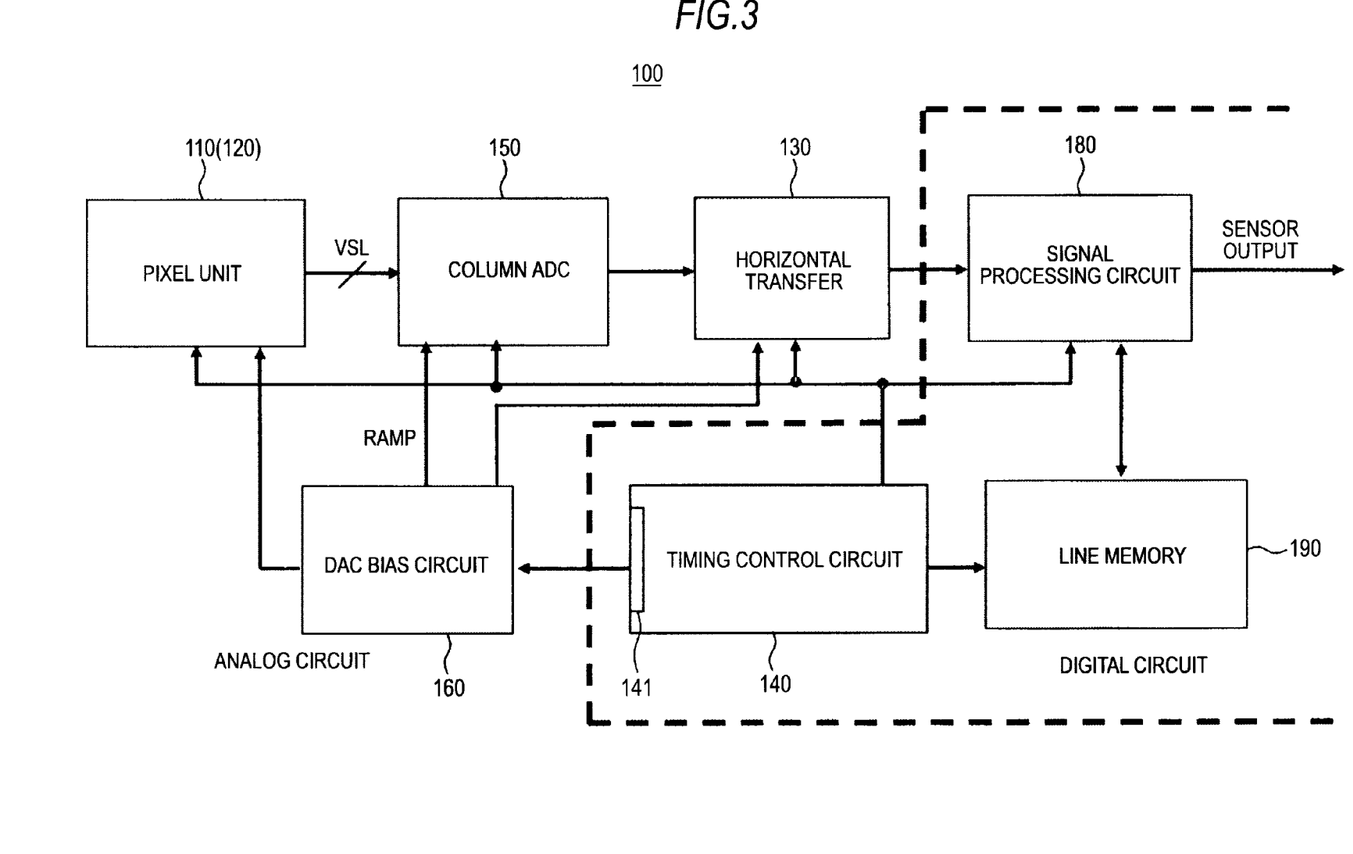
FIG. 3 is a block diagram of a configuration example of a solid-state imaging device (a CMOS image sensor) mounted with column-parallel ADCs according to an embodiment of the present invention.
Figure 4:
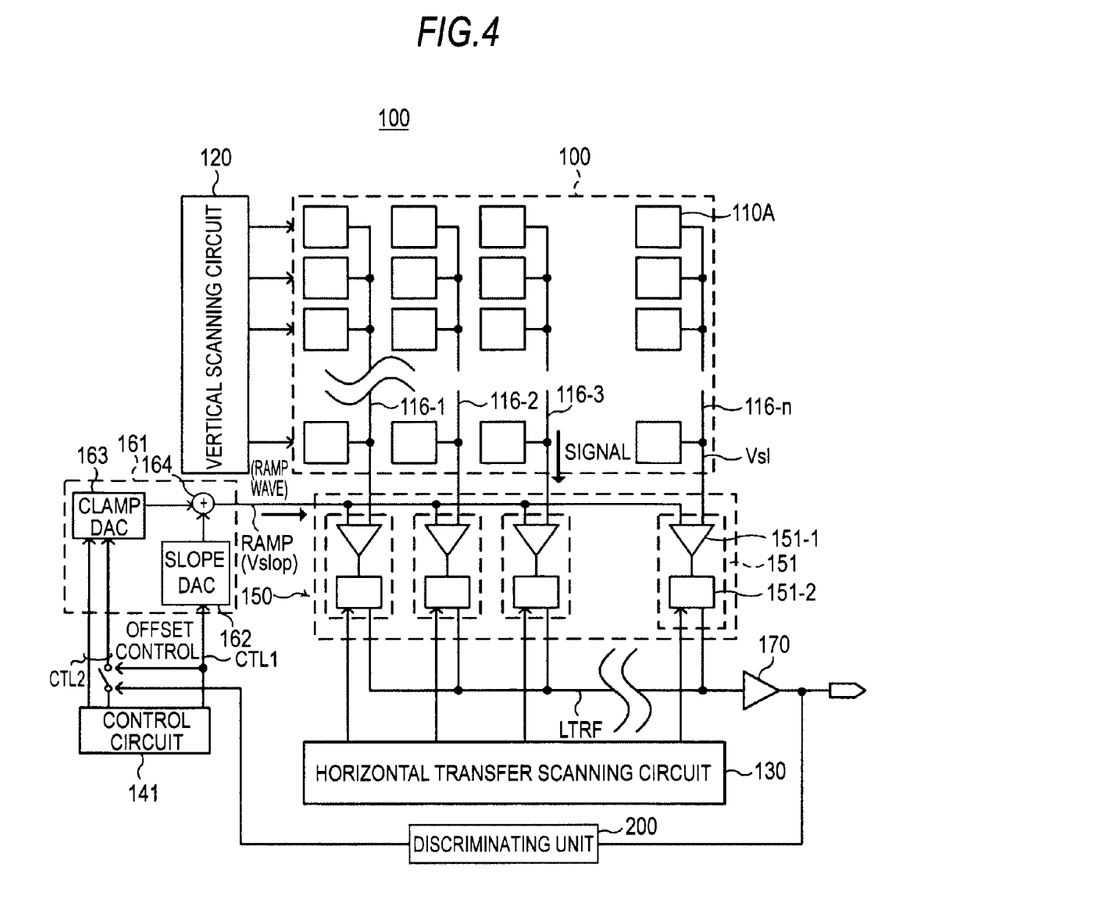
FIG. 4 is a more specific block diagram of an ADC group in the solid-state imaging device (the CMOS image sensor) mounted with column-parallel ADCs shown in FIG. 3.

FIG. 4 is a more specific block diagram of an ADC group in the solid-state imaging device (the CMOS image sensor) mounted with column-parallel ADCs shown in FIG. 3.

<1. Overall Configuration Example of Solid-State Imaging Device>

A solid-state imaging device 100 includes, as shown in FIGS. 3 and 4, a pixel unit 110 as an imaging unit; a vertical scanning circuit 120, a horizontal transfer scanning circuit 130, and a timing control circuit 140.

The solid-state imaging device 100 further includes a column processing circuit group 150 that is an ADC group as a pixel-signal readout circuit and a DAC and bias circuit 160 including a DAC (digital-analog converter) 161.

An adjusting unit includes functions of the timing control circuit 140, the column processing circuit group (the ADC group) 150, and the DAC and bias circuit 160.

The solid-state imaging device 100 includes an amplifier circuit (S/A) 170, a signal processing circuit 180, and a line memory 190.

Among these components, the pixel unit 110, the vertical scanning circuit 120, the horizontal transfer scanning circuit 130, the column processing circuit group (the ADC group) 150, the DAC and bias circuit 160, and the amplifier circuit (S/A) 170 include analog circuits.

The timing control circuit 140, the signal processing circuit 180, and the line memory 190 include digital circuits.

The solid-state imaging device 100 according to this embodiment also includes a discriminating unit 200 that discriminates the luminance of a subject from an output of the amplifier circuit 170.

As explained later, a discrimination result of the discriminating unit 200 is used to determine whether offset adjustment for a clamp DAC is performed.

In the pixel unit 110, plural unit pixels 110A including photodiodes (photoelectric conversion elements) and intra-pixel amplifiers are arrayed in an m×n two-dimensional shape (matrix shape).

[Configuration Example of Unit Pixel]

Figure 5:
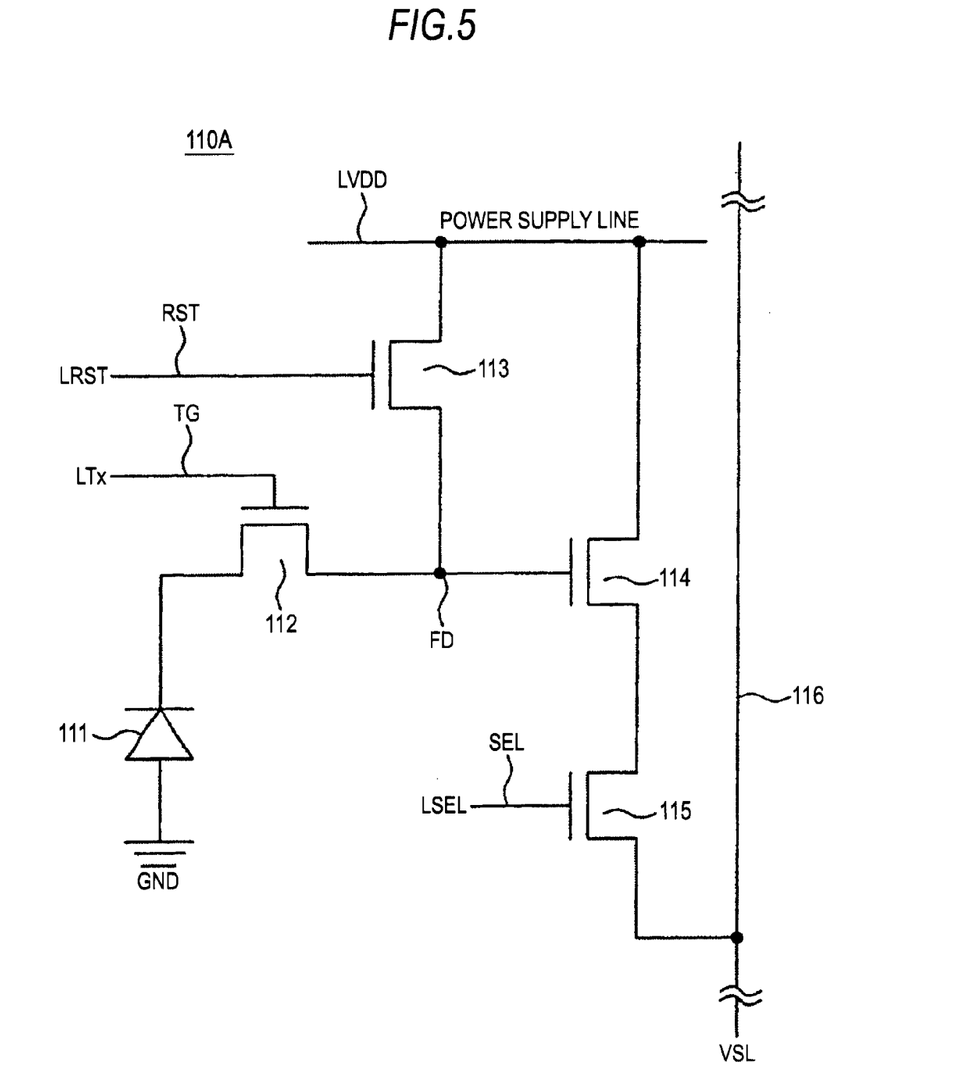
FIG. 5 is a diagram of an example of a pixel of a CMOS image sensor including four transistors according to the embodiment.

FIG. 5 is a diagram of an example of a pixel of a CMOS image sensor including four transistors according to this embodiment.

A unit pixel 110A includes, for example, a photodiode 111 as a photoelectric conversion element.

The unit pixel 110A includes, as active elements, four transistors, i.e., a transfer transistor 112 as a transfer element, a reset transistor 113 as a reset element, an amplifier transistor 114, and a selection transistor 115 with respect to one photodiode 111.

The photodiode 111 photoelectrically converts incident light into charges (electrons) of an amount corresponding to an amount of the incident light.

The transfer transistor 112 is connected between the photodiode 111 and a floating diffusion FD as an output node.

When a driving signal TG is given to a gate (a transfer gate) of the transfer transistor 112 through a transfer control line LTx, the transfer transistor 112 transfers the electrons photoelectrically converted by the photodiode 111 as the photoelectric conversion element to the floating diffusion FD.

The reset transistor 113 is connected between a power supply line LVDD and the floating diffusion FD.

When a reset signal RST is given to a gate of the reset transistor 113 through a reset control line LRST, the reset transistor 113 resets the potential of the floating diffusion FD to the potential of the power supply line LVDD.

A gate of the amplifier transistor 114 is connected to the floating diffusion FD. The amplifier transistor 114 is connected to a vertical signal line 116 via the selection transistor 115 and configures a source follower together with a constant current source on the outside of the pixel unit.

When a control signal (an address signal or a select signal) SEL is given to a gate of the selection transistor 115 through a selection control line LSEL, the selection transistor 115 is turned on.

When the selection transistor 115 is turned on, the amplifier transistor 114 amplifies the potential of the floating diffusion FD and outputs voltage corresponding to the potential to the vertical signal line 116. Voltages output from the pixels are output to the column processing circuit group 150 as a pixel signal readout circuit through the vertical signal line 116.

These kinds of operation are simultaneously performed in parallel for the pixels in one row because, for example, the gates of the transfer transistor 112, the reset transistor 113, and the selection transistor 115 are connected in a unit of rows.

The reset control line LRST, the transfer control line LTx, and the selection control line LSEL wired in the pixel unit 110 are wired as a set in a unit of rows of the pixel array.

The reset control line LRST, the transfer control line LTx, and the selection control line LSEL are driven by the vertical scanning circuit 120 as a pixel driving unit.

In the solid-state imaging device 100, the timing control circuit 140 that generates an internal clock, the vertical scanning circuit 120 that controls a row address and row scanning, and the horizontal transfer scanning circuit 130 that controls a column address and column scanning are arranged. The timing control circuit 140 is a control circuit for sequentially reading out signals of the pixel unit 110.

The timing control circuit 140 generates timing signals necessary for signal processing of the pixel unit 110, the vertical scanning circuit 120, the horizontal transfer scanning circuit 130, the column processing circuit group 150, the DAC and bias circuit 160, the signal processing circuit 180, and the line memory 190.

The timing control circuit 140 includes a DAC control unit 141 that controls generation of a reference signal RAMP (Vslop) of the DAC 161 in the DAC and bias circuit 160.

The DAC control unit 141 performs, for each of rows for which the AD conversion of the column processing circuits (ADCs) 151 of the column processing circuit group 150 is performed, control to adjust offset of the reference signal RAMP.

The DAC control unit 141 can perform, during correlated double sampling (CDS) in the column processing circuit group 150, control to perform offset adjustment for the reference signal RAMP of each of primary sampling and secondary sampling.

The pixel unit 110 photoelectrically converts, for each of pixel rows, a video or a screen image through photon accumulation and discharge using a line shutter and outputs an analog signal VSL to the column processing circuits 151 of the column processing circuit group 150.

The ADC group 150 subjects, in each of ADC blocks (column units), the analog output from the pixel unit 110 to APGA adaptable integrated ADC and digital CDS using the reference signal (the ramp signal) RAMP from the DAC 161 and outputs a digital signal of several bits.

<2. Configuration Example of Column ADC>

In the column processing circuit group 150 according to this embodiment, the column processing circuits (ADCs) 151 as ADC blocks are arrayed in plural columns.

Specifically, the column processing circuit group 150 has a k-bit digital signal converting function. The column processing circuit group 150 includes column-parallel ADC blocks arranged in respective vertical signal lines (column lines) 116-1 to 116-n.

The ADCs 151 include comparators 151-1 that compare the reference signal RAMP (Vslop) as a ramp waveform obtained by stepwise changing a reference signal generated by the DAC 161 and the analog signals Vsl obtained, for the respective row lines, from the pixels through the vertical signal lines.

The ADCs 151 further include counter latches 151-2 that count comparison times and store count results.

Outputs of the counter latches 151-2 are connected to a horizontal transfer line LTRF having, for example, k-bit width.

The k amplifier circuits 170 corresponding to the horizontal transfer line LTRF and the signal processing circuit 180 are arranged.

In the ADC group 150, the comparators 151-1 arranged in the respective columns compare the analog signal potentials Vsl read out to the vertical signal lines 116 with the reference signal Vslop (the ramp signal RAMP as a slope waveform that changes in a linear shape having a certain tilt).

At this point, the counter latches 151-2 arranged in the respective columns in the same manner as the comparators 151-1 are operating.

When the reference signal RAMP (the potential Vslop) as a ramp waveform and counter values change while corresponding to each other in a one-to-one relation, the ADCs 151 convert the potentials (the analog signals) Vsl of the vertical signal lines 116 into digital signals.

The ADCs 151 convert a change in the voltage of the reference signal RAMP (the potential Vslop) into a change in time and convert the time into a digital value by counting the time at a certain period (clock).

When the analog signals Vsl and the reference signal RAMP (Vslop) cross, outputs of the comparators 151-1 are inverted, input clocks of the counter latches 151-2 are stopped or clocks stopped to be input are input to the counter latches 151-2 to complete the AD conversion.

After the AD conversion period explained above ends, data stored in the counter latches 151-2 is transferred to the horizontal transfer line LTRF by the horizontal transfer scanning circuit 130 and input to the signal processing circuit 180 through the amplifiers 170. A two-dimensional image is generated by predetermined signal processing.

The horizontal transfer scanning circuit 130 performs several-channel simultaneous parallel transfer to secure transfer speed.

The timing control circuit 140 generates timing necessary for signal processing in the blocks of the pixel unit 110, the column processing circuit group 150, and the like.

The signal processing circuit 180 at a post stage performs correction of a vertical line defect or a point detect from signals stored in the line memory 190 or clamp processing for the signals and performs digital signal processing such as parallel-serial conversion, compression, encoding, addition, averaging, and intermittent operation.

Digital signals transmitted for the respective pixel rows are stored in the line memory 190.

In the solid-state imaging device 100 according to this embodiment, a digital output of the signal processing circuit 180 is transmitted as an input to an ISP or a baseband LSI.

As a method used in pixel signal readout of the CMOS image sensor, there is a method of temporarily sampling, via a MOS switch arranged near photoelectric conversion elements such as photodiodes, signal charges as optical signals generated by the photoelectric conversion elements in a capacitor ahead of the MOS switch and reading out the signal charges.

In a sampling circuit, noise having inverse correlation is usually superimposed on a sampling capacitance value. In the pixels, when the signal charges are transferred to a sampling capacitor, the signal charges are completely transferred by using a potential gradient. Therefore, noise does not occur in this sampling process. However, noise is superimposed when a voltage level of the capacitor before the sampling process is reset to a certain reference value.

As a method of removing the noise, the CDS is adopted.

This is a method of once reading out and storing a state (a reset level) immediately before the signal charges are sampled, subsequently reading out a signal level after the sampling, and subtracting the reset level from the signal level to remove the noise.

<3. Formation Example of Reference Signal by DAC>

The DAC 161 generates, under the control by the DAC control unit 141, a reference signal (a ramp signal) as a slope waveform that changes in a linear shape having a certain tilt and supplies the reference signal RAMP to the column processing circuit group 150.

The DAC 161 generates, under the control by the DAC control unit 141, the reference signal RAMP subjected to offset adjustment every time the column processing circuits (ADC) 151 of the column processing circuit group 150 perform the AD conversion.

The DAC 161 generates, under the control by the DAC control unit 141, during the CDS in the column processing circuit group 150, the reference signal RAMP subjected to offset adjustment during sampling processing in each of the primary sampling and the secondary sampling.

As shown in FIG. 4, the DAC 161 includes a ramp DAC (a slope DAC) 162, a clamp DAC 163, and an adding unit 164.

Figure 6:
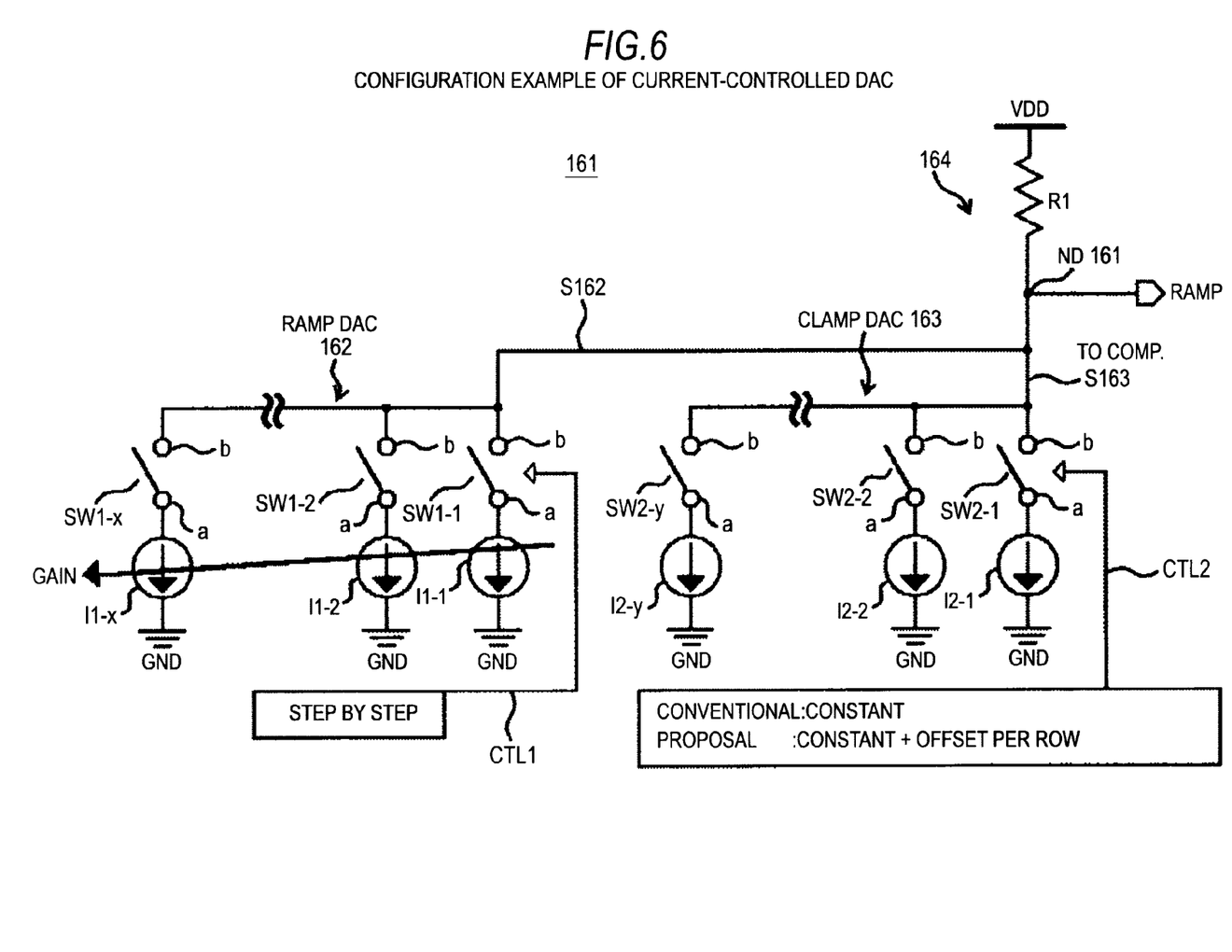
FIG. 6 is a diagram of a basic configuration example of a current-controlled DAC according to the embodiment.

FIG. 6 is a diagram of a basic configuration example of the current-controlled DAC according to this embodiment.

The current-controlled DAC 161 is configured as a power-supply reference type DAC having a power supply VDD as a reference. The current-controlled DAC 161 can also be configured as a ground reference type DAC having a ground GND as a reference.

Specifically, one end of a reference register R1 is connected to the power supply VDD and an output of the ramp DAC 162 and an output of the clamp DAC 163 are connected to the other end of the reference register R1. A lamp output node ND 161 is formed by a connection point of the outputs.

An adding unit 164 is formed by the reference register R1 and the output node ND 161.

The lamp DAC 162 includes x current sources I1-1 to I1-$x$ and switches SW1-1 to SW1-$x$.

The current sources I1-1 to I1-$x$ connected to the ground GND are respectively connected to terminals "a" of the switches SW1-1 to SW1-$x$.

Terminals "b" of the switches SW1-1 to SW1-$x$ are connected in common to the output node ND 161.

The switches SW1-1 to SW1-$x$ are selectively turned on and off according to a control signal CTL1 generated by the DAC control unit 141.

The clamp DAC 163 includes y current sources I2-1 to I2-$y$ and switches SW1-1 to SW2-$y$.

The current sources I2-1 to I2-$y$ connected to the ground GND are respectively connected to terminals "a" of the switches SW2-1 to SW2-$y$.

The terminals "b" of the switches SW2-1 to SW2-$y$ are connected in common to the output node ND 161.

The switches SW2-1 to SW2-$y$ are selectively turned on and off according to a control signal CTL2 generated by the DAC control unit 141.

In the clamp DAC 163, current output including not only a fixed value corresponding to the control signal CTL2 but also an offset value is performed.

In the DAC 161, as shown in FIG. 6, the reference signal RAMP (the ramp wave) in the integrated ADC is generated by adding up an output signal S163 of the clamp DAC 163 for DC level control and an output signal S162 of the ramp DAC 162.

In the control method in the existing technique, during the AD conversion in the rows, a reference signal is generated with an output signal of the clamp DAC 163 set as a fixed value.

Therefore, when there is a difference in the way of rounding in the AD conversion in the primary sampling and the secondary sampling among the columns, it is likely that vertical streaks due to a quantization error occur.

In this embodiment, the output signal S163 of the clamp DAC 163 during the AD conversion in the rows is not fixed (i.e., the control signal is not set as a fixed value) and the control signal CTL2 by pseudo-random numbers is used.

In this embodiment, control by pseudo-random numbers is performed in the primary sampling, the secondary sampling, or both the samplings.

A specific example of the DAC control by pseudo-random numbers is explained below.

Figure 7A:
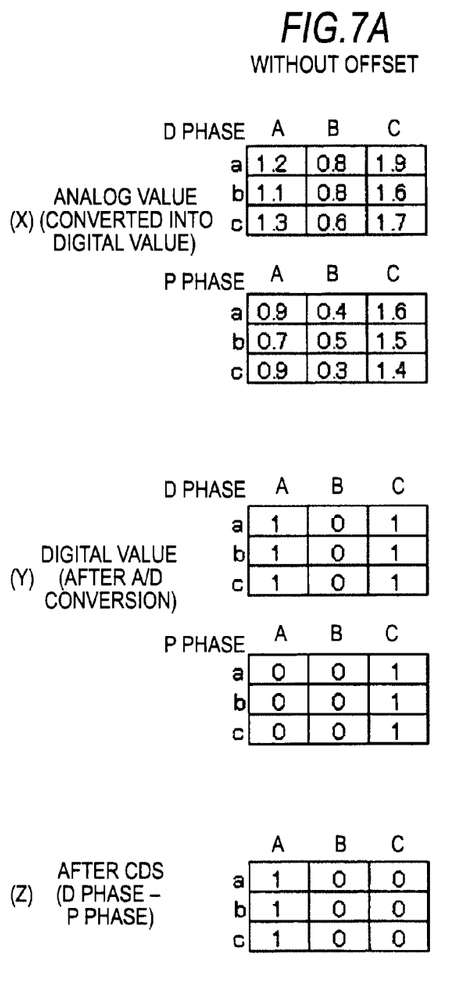
FIGS. 7A and 7B are diagrams for explaining a specific example of DAC control by pseudo-random numbers according to the embodiment.
Figure 7B:
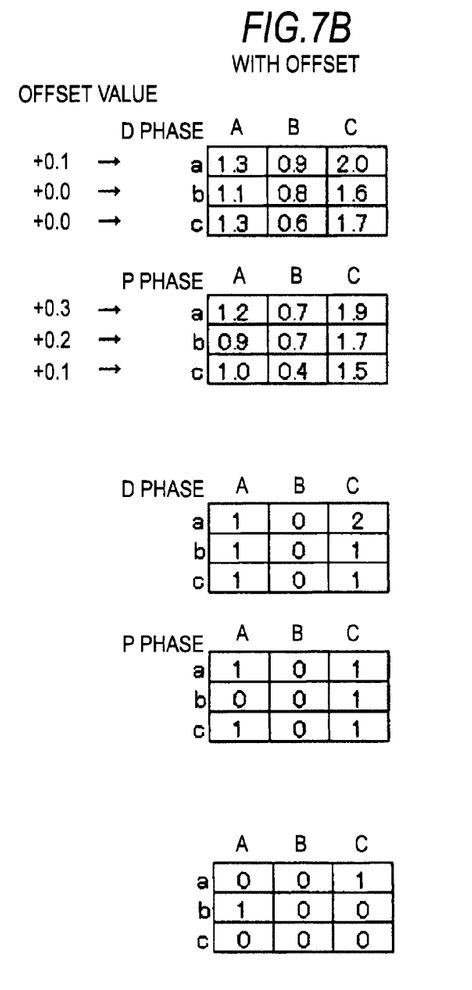

FIGS. 7A and 7B are diagrams for explaining a specific example of the DAC control by pseudo random numbers according to this embodiment.

The DAC control without offset adjustment is shown in FIG. 7A. The DAC control with offset adjustment is shown in FIG. 7B.

In FIGS. 7A and 7B, (X) indicates analog values before the AD conversion, (Y) indicates digital values after the AD conversion, and (Z) indicates values after the CDS.

In this example, in a P phase in the case without the offset adjustment, a digitally-converted analog value in "a" row and "A" column is "0.9", a digitally-converted analog value in "b" row and "A" column is "0.7", and a digitally-converted analog value in "c" row and "A" column is "0.9".

A digitally-converted analog value in "a" row and "B" column is "0.4", a digitally-converted analog value in "b" row and "B" column is "0.5", and a digitally-converted analog value in "c" row and "B" column is "0.3".

A digitally-converted analog value in "a" row and "C" column is "1.6", a digitally-converted analog value in "b" row and "C" column is "1.5", and a digitally-converted analog value in "c" row and "C" column" is "1.4".

For example, as shown in FIGS. 7A and 7B, offset values are set in such a manner that a set value in the "a" row is set to be equivalent to +0.3 LSB (which is originally analog control but, for understanding, the value is digitally converted), +0.2 LSB in the next "b" row, and 0.1 LSB in the next "c" row.

As a result, in the P phase, the digitally-converted analog value in "a" row and "A" column changes from "0.9" to "1.2", the digitally-converted analog value in "b" row and "A" column changes from "0.7" to "0.9", and the digitally-converted analog value in "c" row and "A" column changes from "0.9" to "1.0".

The digitally-converted analog value in "a" row and "B" column changes from "0.4" to "0.7", the digitally-converted analog value in "b" row and "B" column changes from "0.5" to "0.7", and the digitally-converted analog value in "c" row and "B" column changes from "0.3" to "0.4".

The digitally-converted analog value in "a" row and "C" column changes from "1.6" to "1.9", the digitally-converted analog value in "b" row and "C" column changes from "1.5" to "1.7", and the digitally-converted analog value in "c" row and "C" column changes from "1.4" to "1.4".

In a D phase in the case without the offset adjustment, a digitally-converted analog value in "a" row and "A" column is "1.2", a digitally-converted analog value in "b" row and "A" column is "1.1", and a digitally-converted analog value in "c" row and "A" column is "1.3".

A digitally-converted analog value in "a" row and "B" column is "0.8", a digitally-converted analog value in "b" row and "B" column is "0.8", and a digitally-converted analog value in "c" row and "B" column is "0.6".

A digitally-converted analog value in "a" row and "C" column is "1.9", a digitally-converted analog value in "b" row and "C" column is "1.6", and a digitally-converted analog value in "c" row and "C" column is "1.7".

For example, as shown in FIGS. 7A and 7B, offset values are set in such a manner that a set value in the "a" row is set to be equivalent to +0.1 LSB (which is originally analog control but, for understanding, the value is digitally converted), +0.0 LSB in the next "b" row, and 0.0 LSB in the next "c".

As a result, in the P phase, the digitally-converted analog value in "a" row and "A" column changes from "1.2" to "1.3", the digitally-converted analog value in "b" row and "A" column remains at "1.1", and the digitally-converted analog value in "c" row and "A" column remains at "1.3".

The digitally-converted analog value in "a" row and "B" column changes from "0.8" to "0.9", the digitally-converted analog value in "b" row and "B" column remains at "0.8", and the digitally-converted analog value in "c" row and "B" column remains at "0.6".

The digitally-converted analog value in "a" row and "C" column changes from "1.9" to "2.0", the digitally-converted analog value in "b" row and "C" column remains at "1.6", and the digitally-converted analog value in "c" row and "C" column remains at "1.7".

Digital values after the AD conversion in the case without the offset adjustment are as explained below.

In the P phase, the digitally-converted analog value "0.9" in "a" row and "A" column changes to a digital value "0", the digitally-converted analog value "0.7" in "b" row and "A" column changes to a digital value "0", and the digitally-converted analog value "0.9" in "c" row and "A" column changes to a digital value "0".

The digitally-converted analog value "0.4" in "a" row and "B" column changes to a digital value "0", the digitally-converted analog value "0.5" in "b" row and "B" column changes to a digital value and the digitally-converted analog value "0.3" in "c" row and "B" column changes to a digital value "0".

The digitally-converted analog value "1.6" in "a" row and "C" column changes to a digital value "1", the digitally-converted analog value "1.5" in "b" row and "C" column changes to a digital value and the digitally-converted analog value "1.4" in "c" row and "C" column changes to a digital value "1".

In the D phase, the digitally-converted analog value "1.2" in "a" row and "A" column changes to a digital value "1", the digitally-converted analog value "1.1" in "b" row and "A" column changes to a digital value "1", and the digitally-converted analog value "1.3" in "c" row and "A" column changes to a digital value "1".

The digitally-converted analog value "0.8" in "a" row and "B" column changes to a digital value "0", the digitally-converted analog value "0.8" in "b" row and "B" column changes to a digital value "0", and the digitally-converted analog value "0.6" in "c" row and "B" column changes to a digital value "0".

The digitally-converted analog value "1.9" in "a" row and "C" column changes to a digital value "1", the digitally-converted analog value "1.6" in "b" row and "C" column changes to "1", and the digitally-converted analog value "1.7" in "c" row and "C" column changes to a digital value "1".

Digital values after the CDS are as explained below.

The digital value in "a" row and "A" column changes to "1", the digital value in "b" row and "A" column changes to "1", and the digital value in "c" row and "A" column changes to "1".

The digital value in "a" row and "B" column changes to "0", the digital value in "b" row and "B" column changes to "0", and the digital value in "c" row and "B" column changes to "0".

The digital value in "a" row and "C" column changes to "0", the digital value in "b" row and "C" column changes to "0", and the digital value in "c" row and "C" column changes to "0".

In this case, in the "A" column, since correlation among the rows is high, it is likely that the quantization error appears as fixed vertical streaks.

Digital values after the AD conversion in the case with the offset adjustment are as explained below.

In the P phase, a digitally-converted analog value "1.2" in "a" row and "A" column changes to a digital value "1", a digitally-converted analog value "0.9" in "b" row and "A" column changes to a digital value "0", and a digitally-converted analog value "1.0" in "c" row and "A" column changes to a digital value "1".

A digitally-converted analog value "0.7" in "a" row and column changes to a digital value "0", a digitally-converted analog value "0.7" in "b" row and "B" column changes to a digital value "0", and a digitally-converted analog value "0.4" in "c" row and "B" column changes to a digital value "0".

A digitally-converted analog value "1.9" in "a" row and "C" column changes to a digital value "1", a digitally-converted analog value "1.7" in "b" row and "C" column changes to a digital value "1", and a digitally-converted analog value "1.5" in "c" row and "C" column changes to a digital value "1".

In the D phase, a digitally-converted analog value "1.3" in "a" row and "A" column changes to a digital value "1", a digitally-converted analog value "1.1" in "b" row and "A" column changes to a digital value "1", and a digitally-converted analog value "1.3" in "c" row and "A" column changes to a digital value "1".

A digitally-converted analog value "0.9" in "a" row and "B" column changes to a digital value "0", a digitally-converted analog value "0.8" in "b" row and "B" column changes to a digital value "0", and a digitally-converted analog value "0.6" in "c" row and "B" column changes to a digital value "0".

A digitally-converted analog value "2.0" in "a" row and "C" column changes to a digital value "2", a digitally-converted analog value "1.6" in "b" row and "C" column changes to a digital value "1", and a digitally-converted analog value "1.7" in "c" row and "C" column changes to a digital value "1".

Digital values after the CDS are as explained below.

The digital value in "a" row and "A" column changes to "0", the digital value in "b" row and "A" column changes to "1", and the digital value in "c" row and "A" column changes to "0".

The digital value in "a" row and "B" column changes to "0", and the digital value in "b" row and "B" column changes to "0", and the digital value in "c" row and "B" column changes to "0".

The digital value in "a" row and "C" column changes to "1", the digital value in "b" row and "C" column changes to "0", and the digital value in "c" row and "C" column changes to "0".

In this case, in the respective columns, correlation among the rows is not high, it is unlikely that the quantization error appears as fixed vertical streaks.

When the offset adjustment for the output of the clamp DAC 163 is performed as in this embodiment, the output of the clamp DAC 163 changes.

When the output of the clamp DAC 163 changes, a level of the entire reference signal RAMP shifts in every sampling. As a result, time until outputs of the comparators 151-1 are inverted is advanced or delayed and output values of the counters increase or decrease.

In this case, if a clamp DAC that reduces increase or decrease width to 1 LSB or less (adjustment enough for changing a way of rounding during the AD conversion: ±0.5 LSB) is mounted, it is possible to suppress occurrence of quantization vertical streaks after the CDS.

An effect of the offset adjustment is equivalent to that of dither processing. However, it is possible to realize the offset adjustment in analog processing by contriving an existing circuit without a subsequent processing.

The integrated ADC measures, as a signal value, time until outputs of the comparators are inverted.

As explained above, the solid-state imaging device 100 according to this embodiment includes the discriminating unit 200 that discriminates the luminance of a subject from an output of the amplifier circuit 170.

As explained later, a discrimination result of the discriminating unit 200 is used for determining whether offset adjustment for the clamp DAC is performed.

For example, when the luminance is high exceeding a certain threshold and the reference signal RAMP output from the DAC 161 is set to a high gain, the discriminating unit 200 turns off a switch SW3 and controls the output of the clamp DAC 163 to be set to a fixed value.

On the other hand, when the luminance is lower than the threshold and the reference signal RAMP output from the DAC 161 is set to a low gain, the discriminating unit 200 turns on the switch SW3 and controls the output of the clamp DAC 163 to be subjected to the offset adjustment rather than being set to a fixed value.

When a gain is adjusted (an output signal is amplified), the tilt of the reference signal RAMP as the ramp wave is changed and time until outputs of the comparators are inverted is adjusted. However, the change of the tilt of the reference signal RAMP means a change of resolution.

In general, quantization vertical streaks appear more in an image as the resolution is rougher. Therefore, if control for causing the offset adjusting function to work is performed in use at the low gain, this is effective because image quality is not spoiled when a quantization error does not occur.

Since vertical streaks are conspicuous in the dark, control for causing the offset adjusting function to work when an amount of light is small is also effective.

Figure 8:
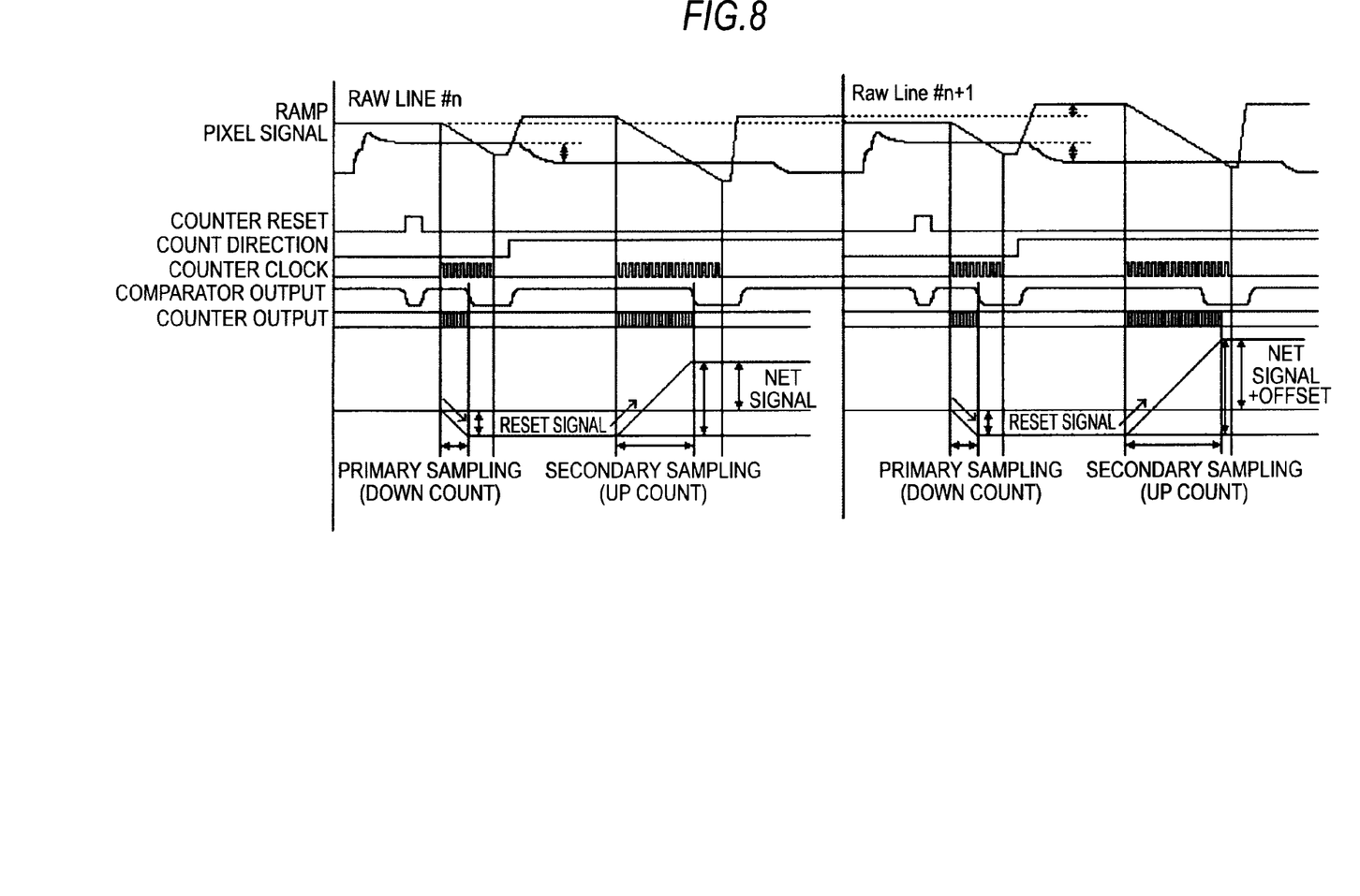
FIG. 8 is a diagram of an operation waveform obtained when an offset adjustment function is selectively applied to each of rows.

FIG. 8 is a diagram of an operation waveform obtained when the offset adjusting function is selectively applied to each of the rows.

In an example shown in FIG. 8, the offset adjusting function is not applied to an nth row and is applied to a (n+1) row.

Operation by the configuration explained above is explained below.

In an example explained below, the offset adjustment for a clamp DAC output is performed in the P phase and the D phase.

This is only an example. It is also possible to perform the offset adjustment control by pseudo-random numbers in the primary sampling, the secondary sampling, or both the samplings. It is also possible selectively perform the offset adjustment control for each of the rows.

During the P phase, the DAC 161 adds up the output signal S163 of the clamp DAC 163 for DC level control and the output signal S162 of the ramp DAC 162 subjected to the offset adjustment and generates the reference signal RAMP (Vslop).

In the column processing circuits (ADCs) 151, the comparators 151-1 arranged in the respective columns compare the analog signal potentials Vsl readout to the vertical signal lines 116 with the reference signal RAMP.

The counter latches 151-2 perform count until levels of the analog potentials Vsl and the reference signal RAMP cross and the outputs of the comparators 151-1 are inverted.

The counter latches 151-2 perform count operation in synchronization with, for example, the clock CLK, stop the count operation when output levels of the comparators 151-1 are inverted, and store values at the time when the count operation is stopped.

Fluctuation in each of the pixels is included in this reset level P phase.

In the second time of the operation, signals photoelectrically converted by the unit pixels 110A are read out to the vertical signal lines 116 (116-1 to 116-n) (the D phase) and the AD conversion is executed.

During the D phase, as in the P phase, the DAC 161 adds up the output signal S163 of the clamp DAC 163 for DC level control and the output signal 5162 of the ramp DAC 162 subjected to the offset adjustment and generates the reference signal RAMP (Vslop).

In the column processing circuits (ADCs) 151, the comparators 151-1 arranged in the respective columns compare the analog signal potentials Vsl readout to the vertical signal lines 116 with the reference signal RAMP.

The counter latches 151-2 perform count until levels of the analog potentials Vsl and the reference signal RAMP cross and the outputs of the comparators 151-1 are inverted.

The counter latches 151-2 perform count operation in synchronization with, for example, the clock CLK, stop the count operation when output levels of the comparators 151-1 are inverted, and store values at the time when the count operation is stopped.

The correlated double sampling (CDS) can be realized by executing (a D phase level-a P phase level) according to results of the P phase and D phase conversion.

Signals converted into digital signals are read out to the amplifier circuits 170 in order by the horizontal (column) transfer scanning circuit 130 via the horizontal transfer line LTRF and finally output.

In this way, the column-parallel output processing is performed.

As explained above, with the solid-state imaging device according to this embodiment, effects explained below can be obtained.

According to this embodiment, a sampling value can be highly precisely controlled only by adjustment of an offset value.

The adjustment is performed for each of the rows to analogically realize dither processing. Occurrence of quantization vertical streaks can be suppressed and deterioration in subjective image quality can be prevented.

The functions can be realized by only adding new control functions to the existing circuit. The size of the circuit is not enlarged.

The solid-state imaging device having such effects can be applied as imaging devices of a digital camera and a video camera.

<4. Configuration Example of Camera System>

Figure 9:
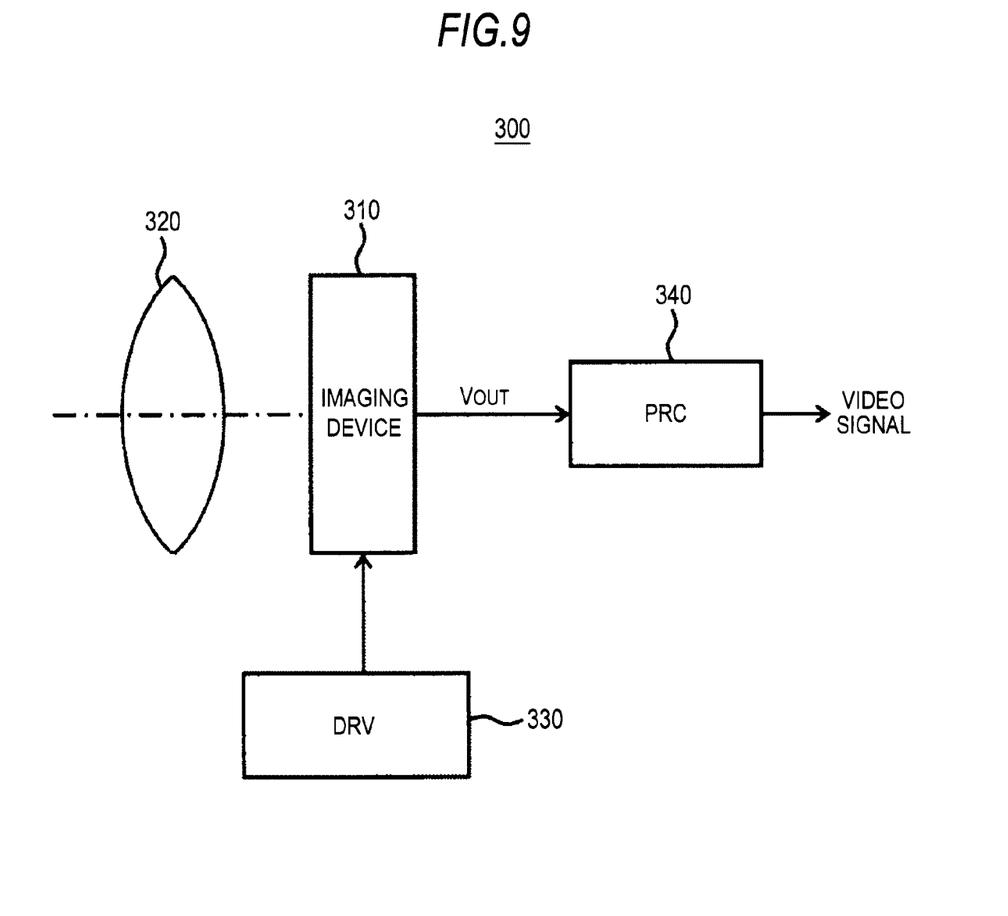
FIG. 9 is a diagram of an example of the configuration of a camera system to which the solid-state imaging device according to the embodiment is applied.

FIG. 9 is a diagram of an example of the configuration of a camera system to which the solid-state imaging device according to this embodiment is applied.

A camera system 300 includes, as shown in FIG. 9, an imaging device 310 to which the solid-state imaging device 100 according to this embodiment can be applied.

The camera system 300 includes, as an optical system that leads incident light to a pixel area of the imaging device 310 (focuses a subject image), for example, a lens 320 that focuses incident light (image light) on an imaging plane.

The camera system 300 further includes a driving circuit (DRV) 330 that drives the imaging device 310 and a signal processing circuit (PRC) 340 that processes an output signal of the imaging device 310.

The driving circuit 330 includes a timing generator (not shown) that generates various timing signals including a start pulse and a clock pulse for driving circuits in the imaging device 310. The driving circuit 330 drives the imaging device 310 with predetermined timing signals.

The signal processing circuit 340 applies predetermined signal processing to an output signal of the imaging device 310.

An image signal processed by the signal processing circuit 340 is recorded in a recording medium such as a memory. Image information recorded in the recording medium is hard copied by a printer or the like. The image signal processed by the signal processing circuit 340 is shown as a moving image on a monitor including a liquid crystal display.

As explained above, it is possible to realize a high-precision camera by mounting the solid-state imaging device 100 as the imaging device 310 in an imaging apparatus such as a digital still camera.

The present application contains subject matter related to that disclosed in Japanese Priority Patent Application JP 2009-174367 filed in the Japan Patent Office on Jul. 27, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
a pixel unit in which plural pixels that perform photoelectric conversion are arrayed in a matrix shape; and
a pixel-signal readout unit that performs readout of pixel signals from the pixel unit in a unit of plural pixels, the pixel-signal readout unit including an AD conversion unit that performs analog-digital (AD) conversion,
the pixel-signal readout unit including
plural comparators that compare a reference signal as a ramp wave and readout analog signal potentials of the pixels in rows in which the comparators are provided,
plural counter latches that are arranged to correspond to the plural comparators and configured to count comparison times of the comparators corresponding thereto, stop the count when outputs of the comparators are inverted, and store values of the count, and
an adjusting unit that performs offset adjustment for the reference signal every time the AD conversion is performed and in accordance with a comparison of a luminance level of an output signal of the pixel-signal readout unit with a predetermined luminance level.

2. The solid-state imaging device according to claim 1, wherein
the pixel-signal readout unit is capable of performing primary sampling and secondary sampling related to count operation by the counter latches and performing correlated double sampling processing, and
the adjusting unit is configured to perform offset adjustment for a reference signal related to at least one sampling of the primary sampling and the secondary sampling.

3. The solid-state imaging device according to claim 1 or 2, wherein the adjusting unit applies clamp processing to the reference signal according to a set value corresponding to a control signal.

4. The solid-state imaging device according to claim 3, wherein the set value is set for each of readout rows.

5. The solid-state imaging device according to claim 3, wherein the set value is set such that an increase and a decrease in output values of the counter latches are within ±0.5 LSB.

6. The solid-state imaging device according to any one of claim 1, wherein the adjusting unit performs adjustment processing for the reference signal in dark in which a luminance level of the reference signal is lower than a the predetermined luminance level.

7. The solid-state imaging device according to claim 1, further comprising:
   a discriminating unit that receives the output signal of the pixel-signal readout unit and discriminates whether the luminance level of the output signal is lower than a the predetermined luminance level, wherein
   the adjusting unit performs adjustment processing for the reference signal when the discriminating unit discriminates that the luminance level of the output signal is lower than the predetermined luminance level.

8. A camera system comprising:
   a solid-state imaging device; and
   an optical system that focuses a subject image on the solid-state imaging device,
   the solid-state imaging device including
      a pixel unit in which plural pixels that perform photoelectric conversion are arrayed in a matrix shape, and
      a pixel-signal readout circuit that performs readout of pixel signals from the pixel unit in a unit of plural pixels, the pixel-signal readout circuit including an AD conversion unit that performs analog-digital (AD) conversion, and the pixel-signal readout circuit including
   plural comparators that compare a reference signal as a ramp wave and readout analog signal potentials of the pixels in rows in which the comparators are provided,
   plural counter latches that are arranged to correspond to the plural comparators and configured to count comparison times of the comparators corresponding thereto, stop the count when outputs of the comparators are inverted, and store values of the count, and
   an adjusting unit that performs offset adjustment for the reference signal every time the AD conversion is performed and in accordance with a comparison of a luminance level of an output signal of the pixel-signal readout unit with a predetermined luminance level.

* * * * *